UNITED STATES PATENT OFFICE.

CHARLES C. PARSONS, OF BROOKLYN, NEW YORK, ASSIGNOR TO THE COLUMBIA CHEMICAL WORKS, OF SAME PLACE.

DETERGENT COMPOUND AND PROCESS OF MAKING THE SAME.

SPECIFICATION forming part of Letters Patent No. 267,455, dated November 14, 1882.

Application filed February 4, 1882. (No specimens.)

*To all whom it may concern:*

Be it known that I, CHARLES C. PARSONS, a citizen of Brooklyn, county of Kings, and State of New York, have invented a new and useful Detergent Compound and Process of Making the Same, of which the following is a full, clear, and accurate description.

In the various processes heretofore practiced for combining ammonia with other substances for making detergents, as well as in the compounds produced, there are serious defects. In preparing liquid compounds a considerable loss of ammonia always takes place, and for containing the compound an expensive case of glass or non-corrosive material, which could be tightly closed with india-rubber or similar substance, is needed. This case is necessarily bulky, because of the small proportion of ammonia which can be used in a liquid mixture. Where salts of ammonia are combined with soaps or other solid detergents either the ammoniacal salt is dissolved in water before being mixed or the soap or other body is not throughly dried, water being present in sufficient quantities to dissolve the ammoniacal salt, and thus cause, in either case, a reaction between it and the alkali in the soap, so that a loss of the ammonia at once takes place.

In carrying out my invention I avoid these objections by carefully and throughly drying both the ammoniacal salts and the other substances with which it is to be compounded before mixing them. I use either caustic or carbonated alkali, or alkaline earth, or any desirable mixture of these, well dried, and unite with this, in preferably about equivalent proportions, sulphate, chloride, or other suitable salt of ammonia, also well dried.

It is generally advantageous to have the component parts of this mixture finely pulverized, as they can then be more uniformly mixed and more readily dissolved when used.

My invention may be practiced in two ways—one in which all the component parts are soluble, and another in which some one or more of the component parts are not soluble and cleanse mechanically. As an example of a detergent in which all the component parts are soluble, I have obtained excellent results from the following: sixty (60) parts of a fair grade of soda-ash and fifty-five (55) parts of sal-ammonia finely pulverized, well dried, and throughly mixed. For some special purposes an excess of soda-ash or other fixed alkali may be used. For general household purposes I prefer to combine this mixture of soda-ash and ammoniacal salt with a well-dried soap powder, in the proportion of two parts of soap powder to one part of the ammoniacal mixture. These proportions, however, are not arbitrary. They may be greatly varied. I prefer a soap powder because soap can be more throughly dried when pulverized.

As an example of the use of my invention, when one or more of the component parts are not soluble, the ammoniacal mixture above given may be mixed with such bodies as pumice-stone, meal, fine sand, or any other like substance which will aid mechanically in the cleansing action of the detergent. In this class of mixtures an alkaline earth—such as lime—may be substituted for the soda. This ammoniacal mixture may also be used with any body or substance as a simple diluent.

I put these mixtures into any suitable package which will keep out moisture and dampness. An ordinary paper, wooden, or metallic wrapper or case will do.

If all the component parts of this mixture are substantially free from water in any form, and are kept dry during the process of mixing, there will be no reaction between them, and they will remain unchanged as long as they are kept dry; but as soon as they are brought in contact with water or other solvent fluid to develop the detergent qualities the ammoniacal salt is dissolved and a decomposition takes place, producing caustic or carbonate of ammonia and an alkaline salt corresponding to the ammoniacal salt which has been used in the mixture.

By this process I can prepare and furnish at a moderate price an ammoniacal detergent compound which will contain a high percentage of ammonia, and which will retain its strength permanently if kept dry, and which will give up its ammonia readily when wanted for use.

Having fully described my invention, what I desire to claim, and secure by Letters Patent, is—

1. The process of preparing a permanent mixture of an ammoniacal salt with any caustic or carbonated alkali or alkaline earth, or any mixture of two or more of them, by making all the component parts of the mixture so free from water that no chemical action can take place between them until water is applied, substantially as set forth.

2. The process of preparing a permanent mixture of an ammoniacal salt with any caustic or carbonated alkali or alkaline earth, or any mixture of two or more of them, and any insoluble body, by making all the component parts of the mixture so free from water that no chemical action can take place between them until water is applied, substantially as set forth.

3. The process of preparing a permanent mixture of an ammoniacal salt with any caustic or carbonated alkali or alkaline earth, or any mixture of two or more of them, and a soap or other cleansing body, by making all the component parts of the mixture so free from water that no chemical action can take place between them until water is applied, substantially as set forth.

4. The above-described detergent compound, consisting of any carbonate or caustic alkali or alkaline earth or any mixture of two or more of these, and an ammoniacal salt, the whole being so free from water that no chemical action will take place between the component parts until water is applied, substantially as set forth.

5. The combination of the above-described ammoniacal detergent compound with soap or any other cleansing body, the whole being so free from water that no chemical action will take place between the component parts until water is applied, substantially as set forth.

6. The combination of the above-described ammoniacal detergent compound with an insoluble body, the whole being so free from water that no chemical action will take place between the component parts until water is applied, substantially as set forth.

7. The combination of the above-described ammoniacal detergent compound with soap or other cleansing body and an insoluble body, the whole being so free from water that no chemical action will take place between the component parts until water is applied, substantially as set forth.

CHARLES C. PARSONS.

Witnesses:
WM. J. PARSONS,
S. A. GOBUSCHMIDTS.